Feb. 19, 1957 E. SCHUTTE ET AL Re. 24,279

SLIP COVER

Original Filed Dec. 16, 1952 2 Sheets-Sheet 1

INVENTORS
WILLIAM J. REAVIS
BY ETHEL SCHUTTE
Klein & Hart
ATTORNEYS

SLIP COVER

Original Filed Dec. 16, 1952 2 Sheets-Sheet 2

INVENTORS
WILLIAM J. REAVIS
ETHEL SCHUTTE
BY Klein & Hart
ATTORNEYS

United States Patent Office

Re. 24,279

Reissued Feb. 19, 1957

24,279

SLIP COVER

Ethel Schutte and William J. Reavis, Baltimore, Md., assignors to S & E Manufacturing Company, Baltimore, Md., a corporation of Maryland Original No. 2,671,499, dated March 9, 1954, Serial No. 326,269, December 16, 1952. Application for reissue March 7, 1956, Serial No. 570,438

(Filed under Rule 47(a) and 35 U. S. C. 116)

4 Claims. (Cl. 155—182)

Matter enclosed in heavy brackets [ ] appears in the original patent but forms no part of this reissue specification; matter printed in italics indicates the additions made by reissue.

This invention relates to an improved slip cover for furniture, particularly upholstered chairs and the like. The invention is especially useful in connection with sofa-beds of the type in which the seat and back portions of the sofa are adapted to be moved with a sliding, pivotal movement relative to the arm rests thereof in converting the sofa into a bed, and in which the line of juncture of the seat and back portions of the sofa, in the converted condition of the sofa, lies intermediate the arm rests and substantially midway between the front and rear ends of the latter.

Sofa-beds of the indicated type, while essentially composed of two arm rests and shiftable seat and back portions, are made in a variety of styles and by reason of the differences in the shapes of such parts in the different styles, it is difficult to provide a universal cover which will neatly and snugly fit the arm rests, seat and back portions of all of such styles. It is the primary purpose of the present invention to provide an improved slip cover which is universally adaptable to neatly and snugly fit any one of the several styles of sofa-beds, including those with open arms, partially open arms or no arms.

Another object of the invention is to provide an improved slip cover which is of such simple construction that it can be made economically in large quantities, can be fitted on and removed from a sofa-bed with a minimum of effort and can be conveniently laundered by the housewife.

Other objects and advantages of the invention, as well as the novel features of construction thereof, will become apparent from a perusal of the following description, when read in connection with the accompanying drawings, in which—

Figure 1:
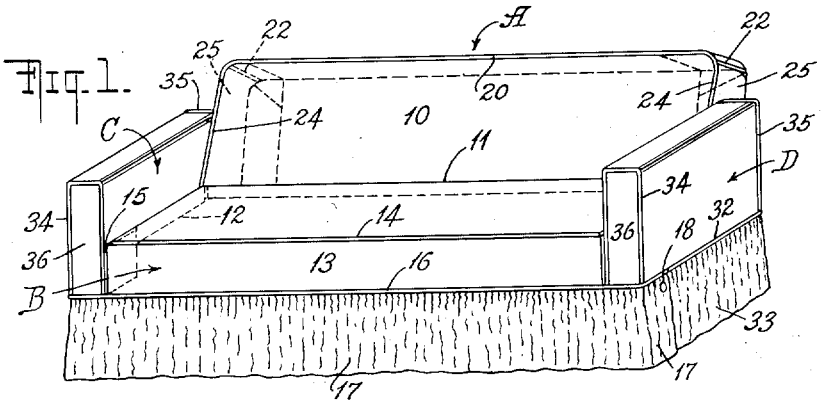
Fig. 1 is a perspective view of the front of a sofa-bed of the indicated type to which a slip cover made in accordance with the present invention has been applied.

Sofa-beds of the type illustrated in the drawings include a back A, a seat B, and arm rests C and D, all of which are usually suitably upholstered. The two arm rests C and D are stationary rising from the base of the sofa to which they are secured. The back A and seat B are movable to transform the sofa into a bed in which condition the adjacent longitudinal edges of the back and seat will lie intermediate the arm rests and substantially midway therebetween. The cover for this type of sofa, in accordance with the invention is composed of three parts, namely, a body portion and two arm rest portions. The body portion is so constructed that when the sofa is converted into a bed, or converted back into its normal sofa form, the portions thereof covering the back and seat of the sofa will be moved with the latter without the necessity of adjusting such cover portions in the several operations.

Figure 3:
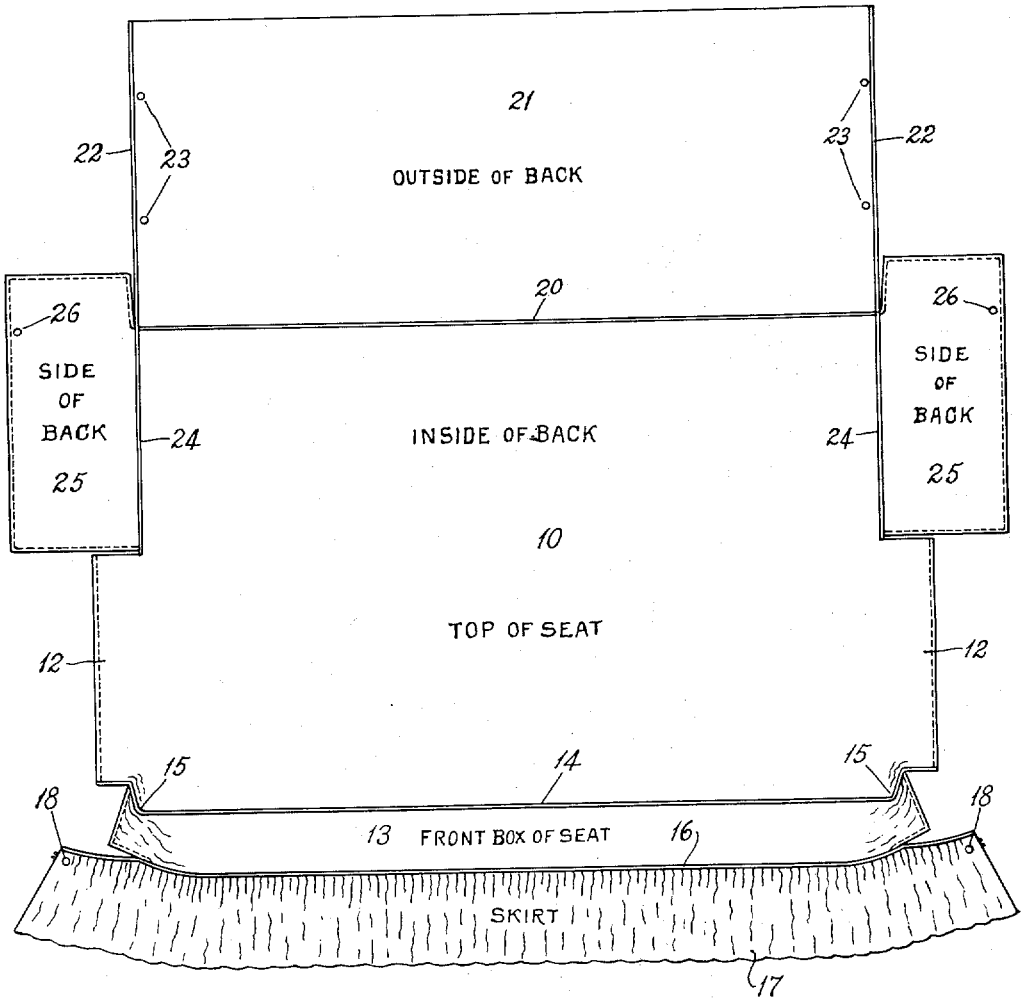
Fig. 3 is a plan view of the body of the slip cover which covers the seat and back of the sofa-bed.

As is shown in Figs. 1 and 3 of the drawings, the body portion of the cover is composed of six pieces of substantially rectangularly-shaped material. The material utilized in the several parts of the cover may be an elastic or stretchable material, such as knitted material, or a non-stretachable fabric such as chintz, cretonne, linen and the like, or a combination of stretchable and non-stretchable fabrics. The largest piece of material in the body portion is the main or central panel 10 which has a length substantially the same as the length of the front of the sofa back A and a width slightly greater than the combined widths of the front of the sofa back A and the top of the seat B. The added width of panel 10 is to provide additional material to be tucked in between the back A and seat B along the line designated 11 in Fig. 1 of the drawings. The panel 10 is provided with two side extensions 12, 12, which are located in the seat covering portion of such panel and which are adapted to be tucked into the space between the ends of the seat B and the arm rests C and D. Seamed to the lower edge of panel 10 is the upper edge of a panel 13 which is adapted to cover the front of the sofa seat B and which is greater in length than such seat, so that the ends of panel 13 may be tucked in between the seat B and the arm rests C and D. The panel 13 however, is not as great in length as the panel 10 in the region of the extensions 12, 12, as will be observed in Fig. 1 of the drawings. The panels 10 and 13 are connected by a binding or welding 14 which defines the top front edge of the seat B and which is turned at its end portion 15, 15 to define the two front corners of the seats. The ends of the cord or welting 14 are connected to the front edges of the extensions 12, 12. It will be noted from Figs. 1 and 3 of the drawings, that the top edge of panel 13 is connected throughout its entire length to the front edge of panel 10 and to portions of the side edges of such panel 10 in front of the extensions 12, 12. The lower edge of panel 13 is connected by a cord or welting 16 to a skirt panel 17. It will be noted from Fig. 1 of the drawings, that the lower edges of the end portions of panel 13 which are connected to the front side edge portions of panel 10 are not connected to the skirt panel 17 by the welting 16, but are free of such skirt panel and welting. The welting however, is connected for its entire length to the skirt panel 17 and both are sufficiently great in length to enable them to overlap a portion of the sides of the arm rests C and D. Fasteners 18, 18 of hook form are suitably connected to the ends of the skirt panel 17 to secure such ends in proper position on the chair, as will hereinafter become more clear.

Secured to the upper longitudinal edge of the panel 10 by a welting 20 which defines the front edge of the top of the back A is the top edge of a panel 21 which covers the top and rear surfaces of the back A of the sofa. Panel 21 has substantially the same dimensions as the combined dimensions of the top and back surfaces of the back A, and is provided along its side free edges with lines of welting 22, 22. Provided along the free side edges of rear panel 21 are fasteners 23 of hook form by which such panel may be properly secured in position on the sofa.

Secured to the side edges of the portion of panel 10 which covers the front and top of the sofa back A by strips of welting 24, 24 that define the side edges of the front of the sofa back A, are two panels 25, 25, which together with panels 10 and 21 form coverings for the ends of the sofa back A. The panels 25, 25 are in effect hinged to the panel 10 and have a width or dimension in the direction of the length of panel 10 substantially greater than the width of the ends of the sofa back A to enable the free side edge portions of such panels to be brought around to the rear of the sofa back. It will be noted in Fig. 1 of the drawings that the panels 25, 25 are connected at their ends to panel 10 at the upper ends of the extensions 12, 12 of panel 10 but are entirely free of such extensions except that they are all connected to panel 10. The height of panels 25, 25 however, is substantially greater than the height of panel 10 so that the upper portions of such panels 25, 25 may be brought over the top surfaces of the sofa back A at the ends thereof. The panels 25, 25 are provided with fasteners 26, 26 of hook form by which they may be secured in adjusted position on the sofa back A.

Figure 4:
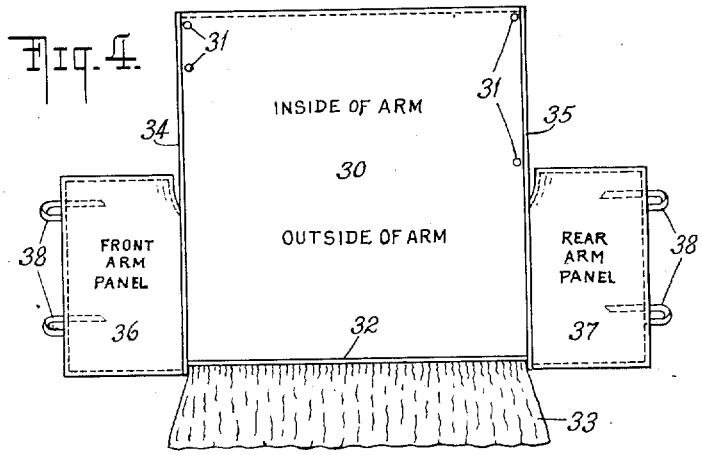
Fig. 4 is a plan view of one of the portions of the cover for an arm rest of the sofa-bed.
Figure 2:
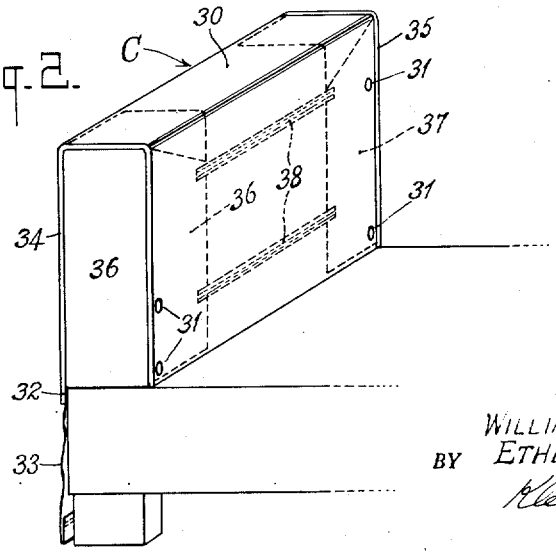
Fig. 2 is a detail showing how the cover is applied to one of the arms of the sofa-bed.

The two coverings for the arm rests C and D of the sofa are similar in construction so that it is believed a description of one will suffice for both. Referring to Figs. 1, 2 and 4 of the drawings, it will be noted that each arm rest covering is composed of a main rectangularly-shaped panel 30 having a length substantially equal to the length or depth of an arm rest and a height substantially equal to the combined heights of the outer and inner surfaces of an arm rest and the width at the top of such arm rest so that such panel 30 covers the outside portion, the top portion and the inside portion of a sofa arm with sufficient material left to be tucked into the space between the seat and arm rest of the sofa. Provided along the side edges of the portion of panel 30 which covers the inner portion of the arm rest are hook-like fasteners 31 by which the panel may be secured in proper position on a sofa arm. Secured to the lower edge of panel 30 by means of a line of welting 32 is a skirt panel 33 having a height the same as skirt panel 17. Secured to the front and rear edges of panel 30 are lines of welting 34 and 35, respectively, which define the front and rear faces, respectively, of the arm rest. It will be noted that the weltings 34 and 35 extend below the welting 32 and are attached to the upper portions of the front and rear edges of the skirt panel 33.

The welting 34 from its lower end thereof to a point spaced above such lower end a distance approximately equal to the height of a sofa arm, connects to arm panel 30, a panel 36 for covering the front face of the arm. The panel 36 has a width substantially greater than the width of the sofa arm so that its outer free side edge may be placed under the front side edge of the portion of panel 30 covering the inside surface of the sofa arm, as shown in Fig. 2 of the drawings. It will be noted that the upper portion of panel 36 is unattached to arm 30 and thus may be fitted snugly around the top front edge of such arm with the excess material underlying panel 30 on the top of the sofa arm, as is also shown in Fig. 2 of the drawings. In a similar fashion a rear face panel 37 having a construction similar to front panel 36 is connected by welting 35 to panel 30 for covering the rear face of the sofa arm in the manner previously described with respect to panel 36. Connected at their ends to the outer side edges of panels 36 and 37 are two elastic members 38, 38, which are disposed on the inner side of the sofa arm, as shown in Fig. 2 of the drawings, and maintain the front and rear covering panels 36 and 37, respectively, in snug relation on the front and rear face portions, respectively, of the arm.

Figures 5, 6, 7, 8:
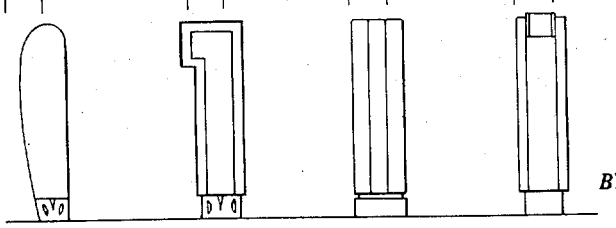
Figs. 5–8 are front elevational views of different styled arm rests which may readily and neatly be covered by the slip cover of this invention.

It will be seen from the foregoing that the cover of the instant invention is composed of a relatively few rectangularly-shaped pieces which can readily be assembled at the factory and are so simply put together that their arrangement on the chair can be readily understood by the housewife. Also, because of the simple, rectangular construction of the pieces, the cover can be readily washed and ironed by the housewife. As a result of the panels 25, 25 on the body portion of the cover and the panels 36, 37 on each arm portion of the cover, it will be understood that the cover may be readily applied in a snug and neat fashion on many different styles of sofas, the contours of which may vary widely. For instance, snug and neat fit may be obtained on sofa arms having either the rectangular shape shown in Fig. 1 of the drawings, or one of the forms shown in Figs. 5 to 7 of the drawings, or an arm provided with a decorative wood panel, such as shown in Fig. 8 of the drawings.

In applying the slip cover to a sofa-bed such as illustrated, the arm covers are preferably first assembled on the arm rests of the sofa. In accomplishing this, each arm cover is placed over the top of an arm rest so that the side edge portions of panels 36, 37 and the elastic straps 38, 38, are on the inner side thereof and then the panel 30 is drawn over on its outer side until the upper ends of the connections of such panel with panels 36 and 37 are positioned at the outer upper corners of the arm rest. After the panels 36 and 37 have been smoothed over the front and rear faces, respectively, of the arm rest, the upper free portions of such panels are fitted over the top of such arm so that they snugly cover the top front and rear faces of the arm rest. The unattached portion of panel 30 is then fitted over the top and inner surfaces of the arm rest and drawn so that the weltings 34 and 35 thereof will substantially conform to the contour of the front and rear surfaces of the arms. When the panels 30, 36 and 37 have been properly adjusted, such panels are secured in position by means of the fasteners 31. The body of the cover is then applied to the sofa by placing the panels 10 and 21 on the back of the sofa so that the lines of welting 20 and 24 outline the front surface of the sofa back. The welting 14 on panel 10 is then placed so that it outlines the top front edge of the sofa seat and the panel 10 smoothed on the front surface of the back and the top surface of the seat with the extensions 12, 12 inserted between the seat and arms and the surplus material of panel 10 tucked in between the seat and back of the sofa. The ends of panel 13 are tucked in between the seat and arm of the sofa and then the ends of the skirt 17 are brought around to the sides of the sofa over the lower ends of arm panels 36 and 37, and the front portions of the arm skirts 33. The ends of skirt 17 are secured in proper position on skirts 33 by means of the fasteners 18. In a manner similar to that explained with respect to the arm panels 36, 37, the panels 25, 25 of the body portion are then brought behind and over the ends of the sofa back and fitted to the contours thereof; the adjusted panels 25, 25, being retained in position by the hooks 26, 26. The back panel 21 is then fitted over the top and back of the sofa and the folded back portions of panels 25, 25 to obtain a proper fit of the weltings 22, 22 on the contours of the sofa top and back. Panel 21 is then secured in position by the fasteners 23 provided thereon to hold such panel and the panels 25, 25 in their adjusted positions.

While we have hereinabove described and illustrated the invention in connection with a slip cover for a sofa-bed, it will be understood by those skilled in the art that the invention is also adaptable to covers for other types of upholstered furniture and that various changes and modifications may be made therein without departing from the spirit of the invention or the scope of the appended claims.

We claim:

1. A slip cover for an article of upholstered furniture having a back, arms and a seat, comprising a cover section for each arm and a section for the back and seat, each of said arm sections comprising a main panel, a skirt portion and a front face panel, said main panel covering the inside, top and outside surfaces of an arm of the article and having when in position on said arm a free inner edge adapted to be tucked in the space between an arm and the seat of the article, and having when in position on said arm an outer edge connected throughout its length by a seam to said skirt portion, and said main panel having when in position on said arm a front edge secured in part by a seam to the outer side edge of said front face panel, the remainder of said front edge being free, said skirt portion having a length at least as long as the front to rear dimension of said arm and being secured throughout its entire length by a seam to the outside edge of said main panel, said front face panel when overlying said arm being connected along its outer edge from a point spaced from the lower edge thereof to a point spaced from the top edge thereof by a seam to the front edge of said main panel, the top and lower portions of the outer edge of said front face panel and the other edges of said front face panel being free, said front face panel having a height substantially less than that of said main panel but greater than the height of the front face of the article arm to enable such front face panel above its connection to said main panel to be folded over the top surface of the article arm and to enable such panel below its connection to said main panel to extend below the seam connecting said skirt portion to said main panel, and said front face panel having a width substantially greater than the front face of the said arm to enable the inner edge of such panel to be drawn around to the inside surface of said arm, the said point of connection spaced from the lower edge of said arm panel and the seam connecting the front edge thereof to said main panel being adapted to fix the position of said main and front face panels on said arm in the assembly of the arm section of the cover on said arm to enable said arm section to be properly arranged on such arm, said section for the back and seat of the article having a depending portion adapted to overlie the front face of said seat between the arms of the article, a second skirt portion having a length greater than the outside length of the article across the front and being secured by a seam to the lower edge of said depending portion, the ends of said second skirt portion being drawn over the free lower edges of said front face panels to overlie the same and to hold them in position on the arms and being drawn around to outside surfaces of the article arms in overlapping relation to the skirt portions of the arm sections.

2. A slip cover for an article of upholstered furniture having a back, arms and a seat, comprising a cover section for each arm and a section for the back and seat, each of said arm sections comprising a main panel, a skirt portion and a front face panel, said main panel covering the inside, top and outside surfaces of an arm of the article and having when in position on said arm a free inner edge adapted to be tucked in the space between an arm and the seat of the article, and having when in position on said arm an outer edge connected throughout its length by a seam to said skirt portion, and said main panel having when in position on said arm a front edge secured in part by a seam to the outer side edge of said front face panel, the remainder of said front edge being free, said skirt portion having a length at least as long as the front to rear dimension of said arm and being secured throughout its entire length by a seam to the outside edge of said main panel, said front face panel when overlying said arm being connected along its outer edge from a point spaced from the lower edge thereof to a point spaced from the top edge thereof by a seam to the front edge of said main panel, the top and lower portions of the outer edge of said front face panel and the other edges of said front face panel being free, said front face panel having a height substantially less than that of said main panel but greater than the height of the front face of the article arm to enable such front face panel above its connection to said main panel to be folded over the top surface of the article arm and to enable such panel below its connection to said main panel to extend below the seam connecting said skirt portion to said main panel, and said front face panel having a width substantially greater than the front face of the said arm to enable the inner edge of such panel to be drawn around to the inside surface of said arm, the said point of connection spaced from the lower edge of said arm panel and the seam connecting the front edge thereof to said main panel being adapted to fix the position of said main and front face panels on said arm in the assembly of the arm section of the cover on said arm to enable said arm section to be properly arranged on such arm, said section for the back and seat of the article having a depending portion adapted to overlie the front face of the seat of the article and including a horizontal portion having free ends adapted to be tucked in between the seat and the arms of the article, and a second skirt portion secured by a seam to the lower edge of said horizontal portion, said depending portion having end extensions of a length as to extend from points between the article arms over the free lower edges of said front face panels to overlie the same and to hold them in position on the arms, and to be drawn around to outside surfaces of the article arms to bring the ends of said second skirt portion in overlapping relation to the skirt portions of the arm sections.

*3. A slip cover for an article of upholstered furniture having a back, arms and a seat, said cover comprising arm sections each substantially in the form of a blank to enable it to be readily draped over the inside, top and outside surfaces of a chair arm, the portion of each section for covering the outside surfaces of a chair arm being wider than the portion thereof for covering the inside surface of such arm and including a rear extension foldable vertically around the rear side of the arm, each of said arm sections having its rear and its front edges free from the seat and back covering portions of the cover, a non-stretchable corded welt provided on and defining said front edge of the arm section, front panels for covering the front faces of the chair arms, each of said front panels having a side edge only secured by said welt to a portion of the front edge of an arm section that will be positioned along a side edge of the front face of an arm when the cover is assembled on a chair, the remaining edge portions of said front panel being separated from the welted front edge of the arm section, each of said front panels having an area substantially greater than the area of the front face of the chair arm, so that edge portions thereof may overlie a side and the top of an arm in overlapping relation to the front edge portion of said arm section, the portion of said welt connecting an arm section and front panel being positionable on a side edge of the front face of an arm to properly position said arm section and front panel with relation to the chair arm and being maintained in such position while the front face panel is drawn across the face of the arm and under the portions of the welted front edge of the arm section that are separated from said face panel, said welt being manipulatable to follow the contour of the sides and top of the front face of an arm and holding the overlapped side and top portions of said front face panel against disarray on the front face of the chair arm.*

*4. A slip cover for an article of upholstered furniture having a back, arms and a seat, said cover comprising arm sections each substantially in the form of a blank to enable it to be readily draped over the inside, top and outside surfaces of a chair arm, the portion of each section for covering the outside surfaces of a chair arm being wider than the portion thereof for covering the inside surface of such arm and including a rear extension foldable vertically around the rear side of the arm, each of said arm sections having its rear and its front edges free from the seat and back covering portions of the cover, a non-stretchable corded welt provided on and defining said front edge of the arm section, front panels for covering the front faces of the chair arms, each of said front panels having a side edge only secured by said welt*

*to a portion of the front edge of an arm section that will be positioned along a side edge of the front face of an arm when the cover is assembled on a chair, the remaining edge portions of said front panel being separated from the welted front edge of the arm section, each of said front panels having an area substantially greater than the area of the front face of the chair arm, so that edge portions thereof may overlie a side and the top of an arm in overlapping relation to the front edge portion of said arm section, the portion of said welt connecting an arm section and front panel being positionable on a side edge of the front face of an arm to properly position said arm section and front panel with relation to the chair arm and being maintained in such position while the front face panel is drawn across the face of the arm and under the portions of the welted front edge of the arm section that are separated from said face panel, said welt being manipulatable to follow the contour of the sides and top of the front face of an arm and holding the overlapped side and top portions of said front face panel against disarray on the front face of the chair arm, the covering portion for the seat of the article having connected there-*

*to a depending portion adapted to overlie the front face of the seat of the article and including end extensions extending from points between the article arms outwardly to overlie the bottom edge portions of the front panels and hold the latter in position against disarrangement on the front faces of the chair arms, said depending portion including a non-stretchable corded welt extending into said extensions thereof and enabling the latter to coact with the welts along the front edges of the arm sections to lock the front panels in proper position on the chair.*

References Cited in the file of this patent or the original patent

UNITED STATES PATENTS

| | | |
|---|---|---|
| 1,817,404 | Whaley | Aug. 4, 1931 |
| 1,825,909 | Levi | Oct. 6, 1931 |
| 2,004,982 | Fry | June 18, 1935 |
| 2,179,805 | Trubitz | Nov. 14, 1939 |
| 2,373,071 | Waranch | Apr. 3, 1945 |
| 2,416,806 | Waranch | Mar. 4, 1947 |
| 2,418,092 | Passel | Mar. 25, 1947 |